US010444966B2

(12) United States Patent
Seong

(10) Patent No.: US 10,444,966 B2
(45) Date of Patent: Oct. 15, 2019

(54) METHOD AND APPARATUS FOR CONTROLLING NUMBER INPUT IN AN ELECTRONIC DEVICE

(71) Applicant: Samsung Electronics Co., Ltd., Gyeonggi-do (KR)

(72) Inventor: Jinha Seong, Seoul (KR)

(73) Assignee: Samsung Electronics Co., Ltd. (KR)

( * ) Notice: Subject to any disclaimer, the term of this patent is extended or adjusted under 35 U.S.C. 154(b) by 423 days.

(21) Appl. No.: 14/685,156

(22) Filed: Apr. 13, 2015

(65) Prior Publication Data
US 2015/0293687 A1 Oct. 15, 2015

(30) Foreign Application Priority Data
Apr. 11, 2014 (KR) .................. 10-2014-0043364

(51) Int. Cl.
*G06F 3/0484* (2013.01)
*G06F 3/0488* (2013.01)

(52) U.S. Cl.
CPC ........ *G06F 3/04847* (2013.01); *G06F 3/0484* (2013.01); *G06F 3/04886* (2013.01)

(58) Field of Classification Search
CPC . G06F 3/0484; G06F 3/04847; G06F 3/04886
See application file for complete search history.

(56) References Cited

U.S. PATENT DOCUMENTS

| | | | | |
|---|---|---|---|---|
| 5,634,100 A | * | 5/1997 | Capps | G06F 15/0266 705/7.12 |
| 5,734,597 A | * | 3/1998 | Molnar | G06F 3/04847 708/112 |
| 6,549,219 B2 | | 4/2003 | Selker | |
| 7,081,905 B1 | * | 7/2006 | Raghunath | G04G 5/00 345/684 |
| 7,907,476 B2 | * | 3/2011 | Lee | G04G 5/04 345/173 |
| 7,992,102 B1 | * | 8/2011 | De Angelo | G06F 3/0482 715/804 |
| 8,375,329 B2 | | 2/2013 | Drayton et al. | |
| 9,015,627 B2 | * | 4/2015 | Lal | G06F 3/0488 345/173 |
| 9,250,766 B2 | * | 2/2016 | Gil | G06F 3/04812 |
| 2002/0131331 A1 | * | 9/2002 | Molander | G04G 21/00 368/82 |
| 2008/0165149 A1 | * | 7/2008 | Platzer | G04G 11/00 345/173 |

(Continued)

*Primary Examiner* — Justin R. Blaufeld
(74) *Attorney, Agent, or Firm* — The Farrell Law Firm, P.C.

(57) ABSTRACT

A method and an apparatus are provided for controlling number input in an electronic device. The method includes displaying at least one number; receiving a selection of a first number from the displayed at least one number; determining an attribute of the first number; displaying, in a foreground layer, an expanded menu including a plurality of numbers for changing the first number, the expanded menu corresponding to the determined attribute; receiving a selection of a second number from the plurality of numbers included in the expanded menu; and ending the displaying of the expanded menu and replacing the first number from the displayed at least one number with the selected second number.

17 Claims, 19 Drawing Sheets

(56) References Cited

U.S. PATENT DOCUMENTS

| | | | |
|---|---|---|---|
| 2009/0187860 A1* | 7/2009 | Fleck | G06F 3/0482 715/834 |
| 2010/0225599 A1* | 9/2010 | Danielsson | G06F 3/0237 345/173 |
| 2010/0306702 A1* | 12/2010 | Warner | G06F 3/0482 715/811 |
| 2011/0047014 A1* | 2/2011 | De Angelo | G06F 3/0482 705/14.4 |
| 2012/0092383 A1* | 4/2012 | Hysek | G04G 9/00 345/684 |
| 2013/0019204 A1* | 1/2013 | Kotler | G06F 3/04812 715/833 |
| 2013/0067399 A1* | 3/2013 | Elliott | G06F 3/0482 715/800 |
| 2014/0219066 A1* | 8/2014 | Sadilek | G06F 3/04886 368/82 |
| 2014/0229832 A1* | 8/2014 | LaFayette | G06F 3/048 715/719 |
| 2015/0012857 A1* | 1/2015 | Tang | G06F 3/04886 715/768 |
| 2015/0169057 A1* | 6/2015 | Shiroor | G06F 3/0482 715/702 |

* cited by examiner

<413>

<412>

<411>

<410>

<430>  <431>

<440>

<441>

<610>

<611>

<612>

<613>

<630>

<621>

<622>

<623>

<630>

<631>

<812>

<811>

<810>

<1001>

<1002>

<1003>

<1004>

METHOD AND APPARATUS FOR CONTROLLING NUMBER INPUT IN AN ELECTRONIC DEVICE

PRIORITY

This application claims priority under 35 U.S.C. § 119(a) to Korean Patent Application No. 10-2014-0043364, which was filed in the Korean Intellectual Property Office on Apr. 11, 2014, the content of which is hereby incorporated by reference.

BACKGROUND OF THE INVENTION

1. Field of the Invention

The present invention relates generally to a method and an apparatus for controlling number input in an electronic device, and more particularly, to a method and an apparatus for controlling date and time input in an electronic device.

2. Description of the Related Art

When a touch input, such as a single touch, drag, tap, flick, hold, etc., is detected in an electronic device including a touch screen, the electronic device performs a function corresponding to the touch input. For example, if the touch input is for selecting 'time' to fix an alarm time in an alarm application, a changed time is displayed to correspond to the touch input. The touch input may be an event for directly inputting a number using an event for touching a number corresponding to 'time' and a virtual keypad, or may be an event using a +/− button.

However, using a virtual keyboard, which is a commonly used interface, often lacks interest and freshness compared with rapidly changing trends in mobile devices. Further, a method of using a +/− button is often inconvenient because a large number of scrolls or taps must be input.

SUMMARY OF THE INVENTION

Accordingly, the present invention is designed to address at least the problems and/or disadvantages described above and to provide at least the advantages described below. An aspect of the present invention is to provide an improved apparatus and method for controlling number input.

Another aspect of the present invention is to provide a method and an apparatus for inputting a time and a date through an improved number input user interface in an electronic device.

Another aspect of the present invention is to provide a method and an apparatus for interestingly and rapidly inputting numbers, such as a time and a date, through an improved number input user interface.

In accordance with an aspect of the present invention, a method of controlling number input in an electronic device is provided. The method includes displaying at least one number; receiving a selection of a first number from the displayed at least one number; determining an attribute of the first number; displaying, in a foreground layer, an expanded menu including a plurality of numbers for changing the first number, the expanded menu corresponding to the determined attribute; receiving a selection of a second number from the plurality of numbers included in the expanded menu; and ending the displaying of the expanded menu and replacing the first number from the displayed at least one number with the selected second number.

In accordance with another aspect of the present invention, an apparatus is provided for controlling number input an electronic device. The apparatus includes a display; a touch panel that detects touch input from a user; and a controller that displays at least one number on the display, receives, from the touch panel, a selection of a first number from the displayed at least one number, determines an attribute of the first number, displays, on the display, in a foreground layer, an expanded menu including a plurality of numbers for changing the first number, the expanded menu corresponding to the determined attribute, receives, from the touch panel, a selection of a second number from the plurality of numbers included in the expanded menu, and ends the display of the expanded menu and replaces the first number from the displayed at least one number with the selected second number.

BRIEF DESCRIPTION OF THE DRAWINGS

The above and other aspects, features, and advantages of certain embodiments of the present invention will be more apparent from the following detailed description in conjunction with the accompanying drawings, in which.

DETAILED DESCRIPTION OF THE EMBODIMENTS OF THE INVENTION

Figure 1:
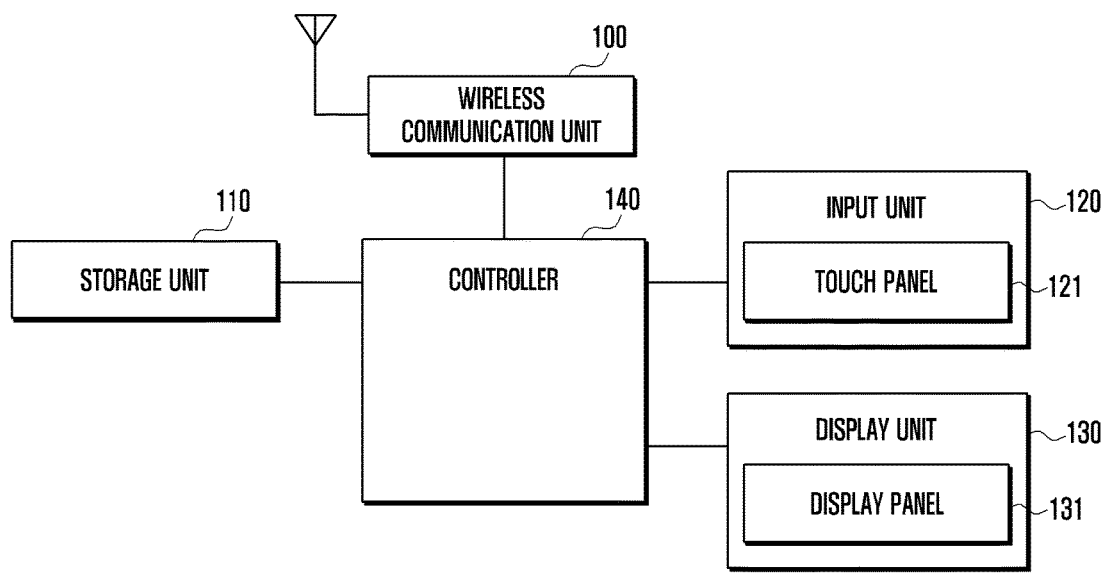
FIG. 1 illustrates an electronic device according to an embodiment of the present invention.

Hereinafter, various embodiments of the present invention will be described in detail with reference to the accompanying drawings. It should be noted that the same elements will be designated by the same reference numerals although they are shown in different drawings. Further, a detailed description of a known function and configuration which may make the subject matter of the present invention unclear will be omitted. Hereinafter, it should be noted that only the descriptions will be provided that may help understanding the operations provided in association with the various embodiments of the present invention, and other descriptions will be omitted to avoid making the subject matter of the present invention rather unclear.

FIG. 1 illustrates an electronic device according to an embodiment of the present invention.

Referring to FIG. 1, the electronic device includes a wireless communication unit 100, a storage unit 110, an input unit 120, a display unit 130, and a controller 140.

The wireless communication unit 100 may include one or more modules for performing wireless communication between the electronic device and a wireless communication system or a network including another electronic device. For example, the wireless communication unit 100 may include a mobile communication module, a Wireless Local Area Network (WLAN) module, a short-range communication module, a location calculating module, a broadcast receiving module and the like.

The storage unit 110 stores programs for the electronic device. Further, the storage unit 110 stores attributes of numbers such as dates (year/month/day), times (hour/minute/second), etc. For example, the attribute of an "hour" is 24 hours, and 1 a.m. to 12 a.m. and 1 p.m. to 12 p.m. may be stored when the hour is displayed in units of 12 hours and 01 to 24 may be stored when the hour is displayed in units of 24 hours.

The input unit 120 includes a touch panel 121. If a user input occurs through touch panel 121, the touch panel 121 transmits the user input to the controller 140. For example, the user input may be made by a touch input device such as a pen or a finger. The touch panel 121 may detect a request for inputting or correcting (hereinafter, referred to as "inputting") dates or times.

The display unit 130 includes a display panel 131. The display panel 131 may display numbers, such as dates and times, under the control of the controller 140. The display panel 131 displays an expanded menu corresponding to a selected number such that numbers such as dates and times may be input.

The controller 140 executes, for example, a calendar or an alarm application upon request of the user. The application displays numbers. The controller 140 detects selection of a first number from the displayed numbers to input a number. Here, the first number is a number that is arbitrarily selected from the displayed numbers. The controller 140 determines an attribute of the selected first number. Thereafter, the controller 140 displays an expanded menu for changing a number with an attribute corresponding to the attribute of the selected first number in a foreground layer. The foreground layer may be set such that a layer that detects selection of the first number is different from another layer to display the expanded menu. For example, the foreground layer may be activated, and another layer may be non-activated. Alternatively, the foreground layer and the another layer may be activated.

Thereafter, the controller 140 determines whether a second number is selected from the numbers displayed in the expanded menu. The second number is an arbitrary number selected by the user from the numbers displayed in the expanded menu.

The controller 140 changes the first number selected from the displayed numbers to the second number selected from the expanded menu. If the change of a number is completed, the controller 140 ends the displaying of the foreground layer.

Thereafter, the controller 140 displays the changed number.

Figure 2:
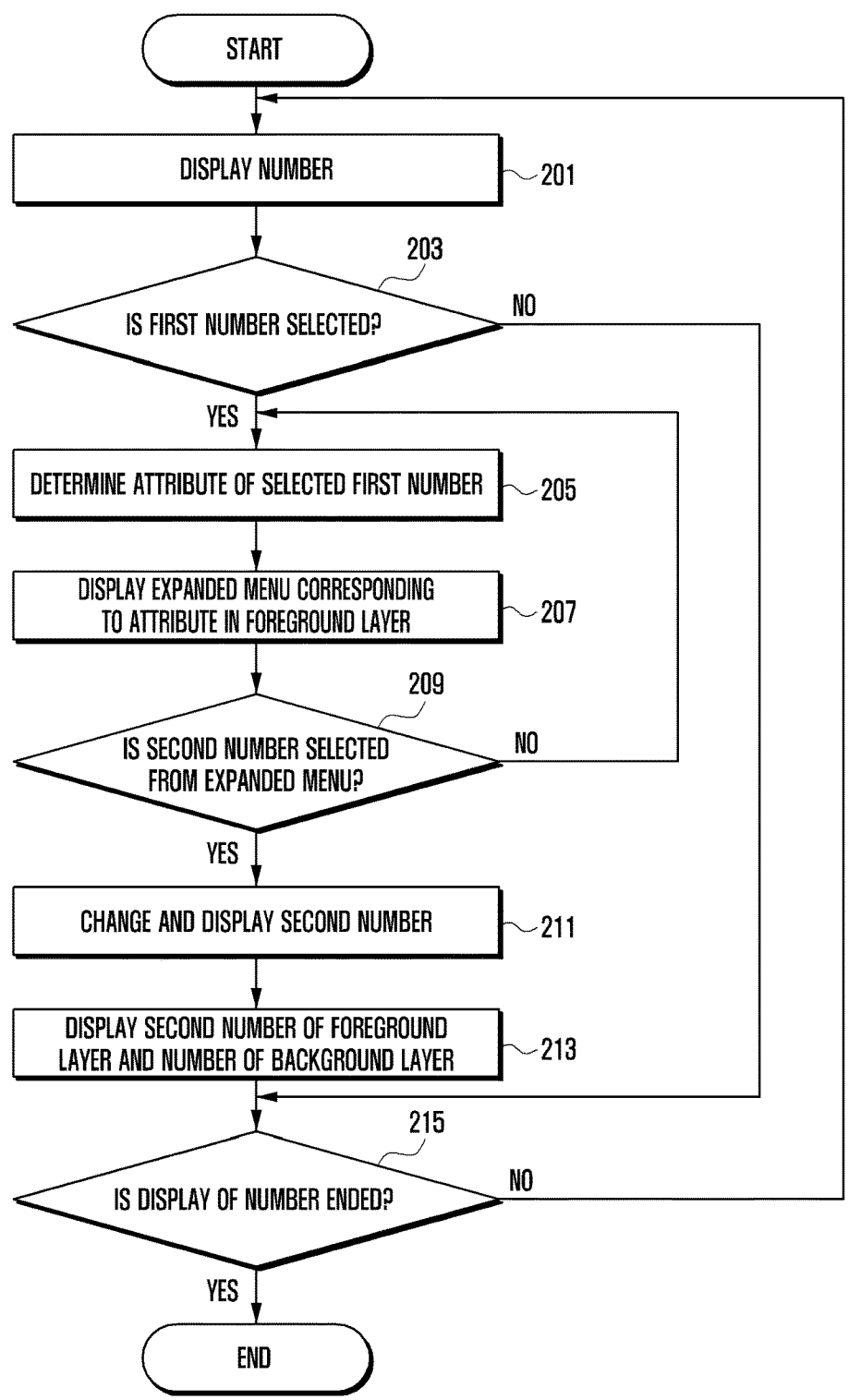
FIG. 2 is a flowchart illustrating a process of inputting a number according to an embodiment of the present invention.

FIG. 2 is a flowchart illustrating a process of inputting a number according to an embodiment of the present invention.

Referring to FIGS. 1 and 2, the controller 140 displays a number in step 201. Here, the number includes a number such as a date or a time, when a calendar or an alarm application is executed.

While at least one number, such as a date or a time, is displayed, the controller 140 determines whether selection of a first number is detected in step 203. For example, the user may select one of the displayed numbers using a touch input, such as a tap, a double tap, a drag, a touch, a long touch, a double touch, a drop, a flick, or a pen touch.

If the selection of the first number is detected, the controller 140 determines an attribute of the selected first number in step 205. For example, if the selected first number is an hour, the attribute of the hour is 24 hours and may be in units of 24 hours or 12 hours. As another example, the first number may be a minute, with an attribute of 60 minutes.

In step 207, the controller 140 displays numbers corresponding to the determined attribute in an expanded menu of the foreground layer.

At the same time, the controller 140 may overlay and blur numbers that have not been selected in the background layer in step 203. Further, the background layer may be disabled such that a user input may not be detected therein.

In the expanded menu, the numbers expanded from the first number toward the outside may be displayed in a circle, such that a number value may be set by dialing the numbers according to the attribute (e.g., year, month, day, time, and minute) of the selected first number.

If the selection of the second number from the menu is detected in step 209, the selected first number is changed to the second number selected from the expanded menu in step 211. For example, the second number may be selected at a drop location in an expanded menu formed by dragging the first number, or may be selected through a tap in an expanded menu formed by long touching the first number. Further, the expanded menu may be selected by a long touch, a double tap, or a flick.

In step 213, the controller 140 displays the changed second number of the foreground layer and a number of a background layer together.

If a request to end the displaying of the number (for example, ending an alarm application) is detected in step 215, the controller 140 ends the displaying of the number. However, if a request to end displaying of the number is not detected, the process returns to step 201.

Figure 3A:
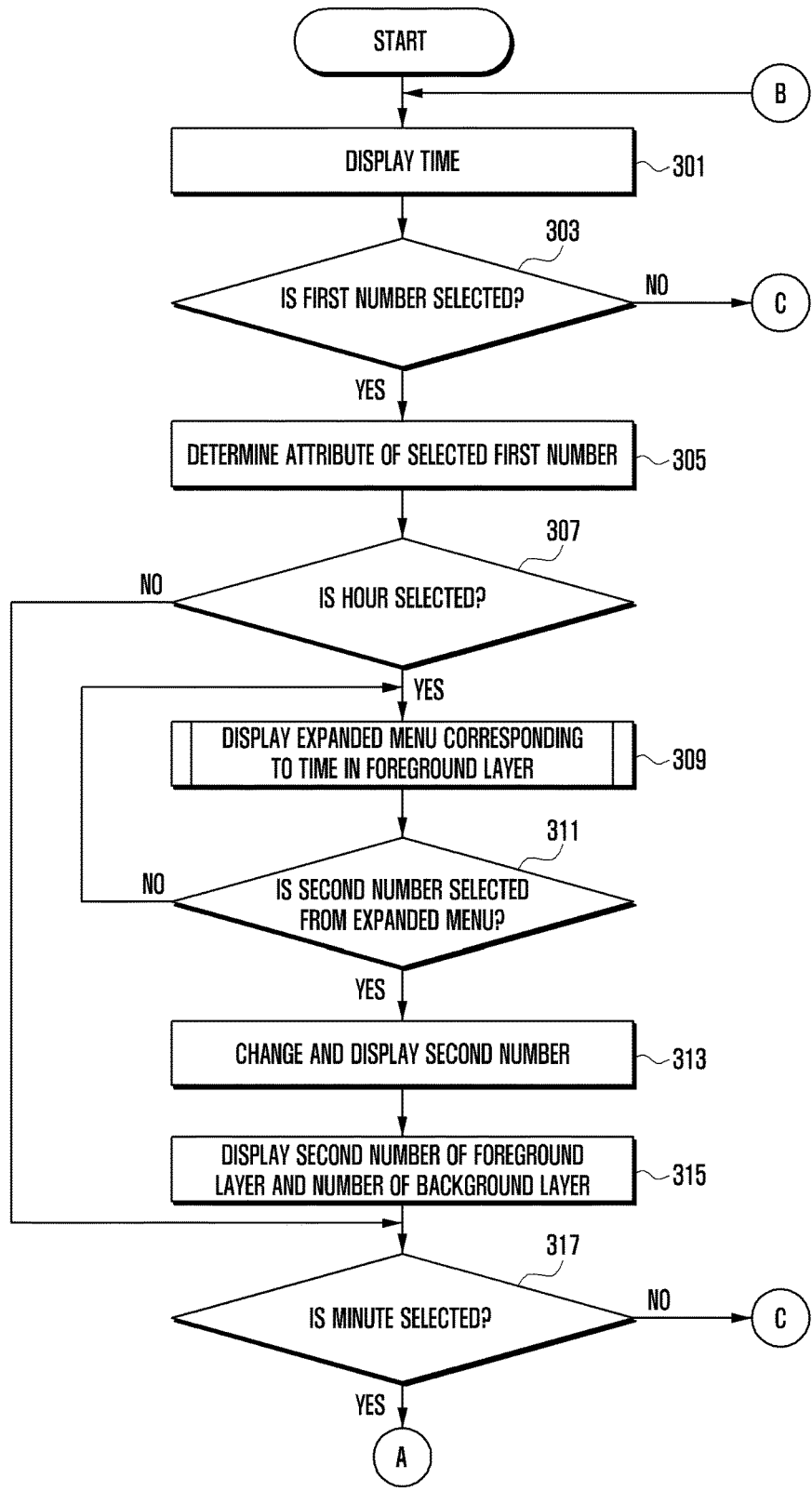
FIGS. 3A and 3B are flowcharts illustrating a process of inputting time according to an embodiment of the present invention.
Figure 3B:
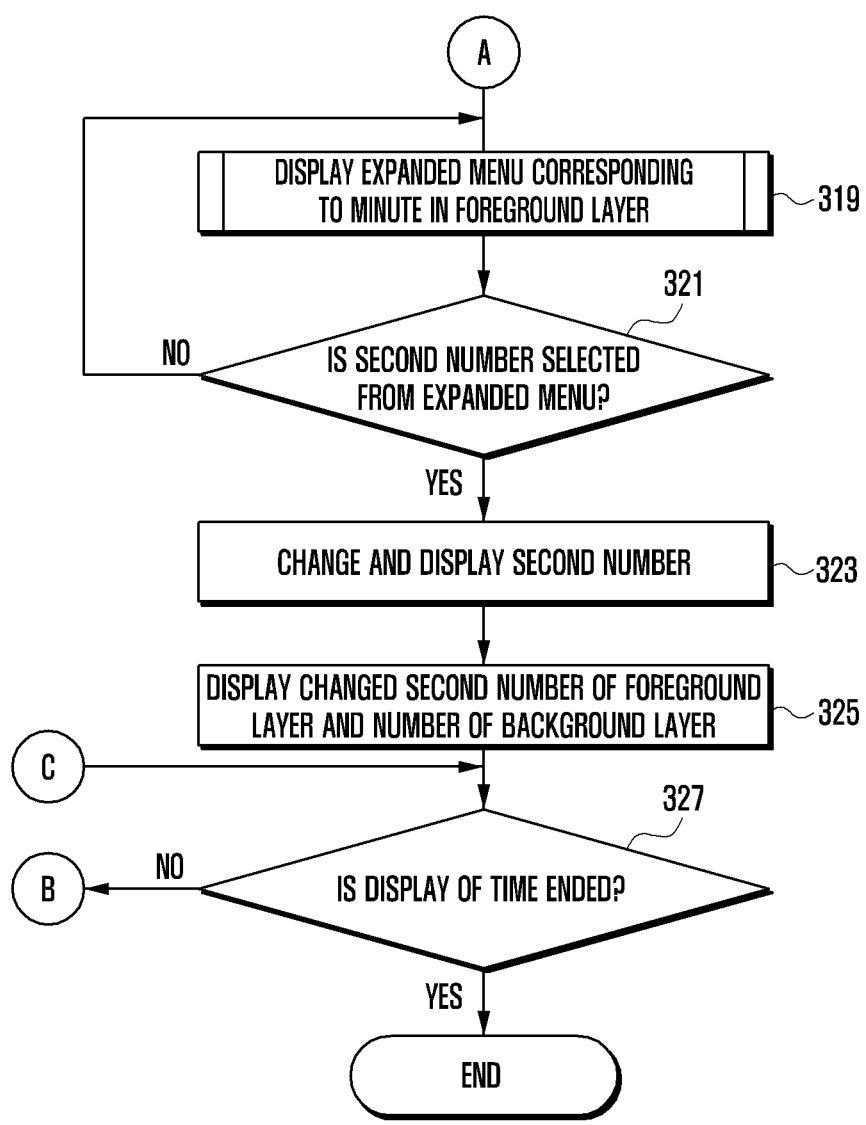
Figure 4A:
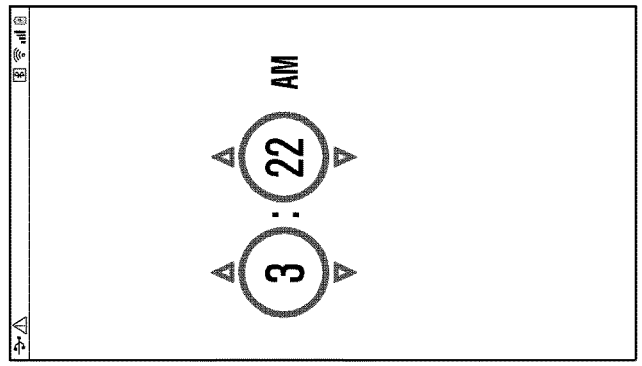
FIGS. 4A and 4D illustrate examples of screens displayed while inputting time according to an embodiment of the present invention.
Figure 4A:
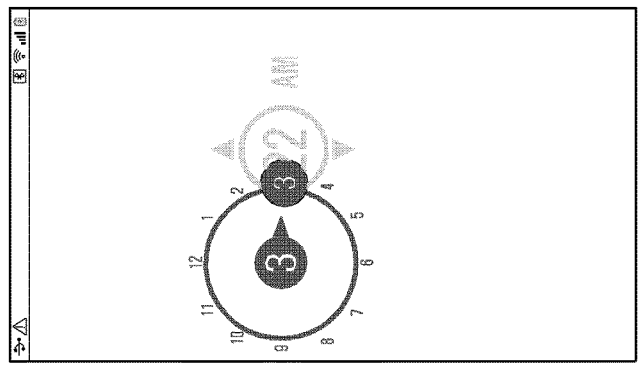
Figure 4A:
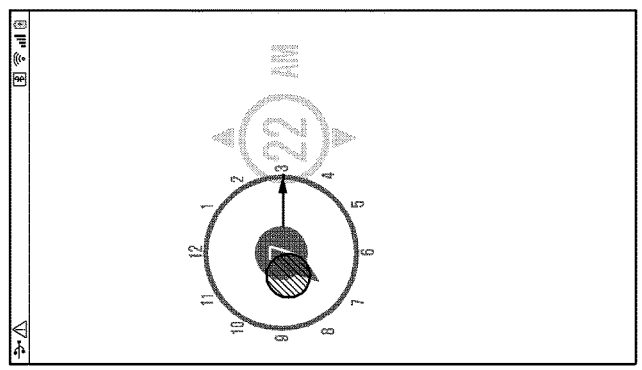
Figure 4A:
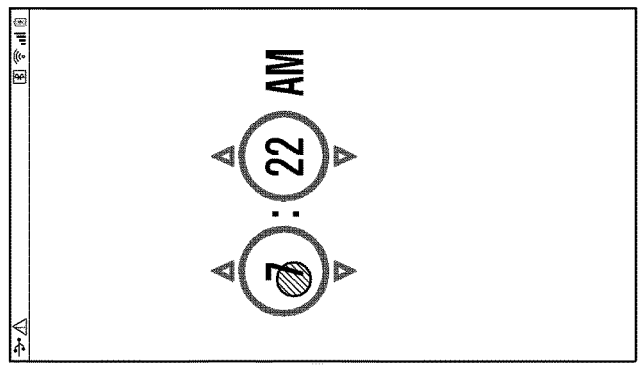
Figure 4B:
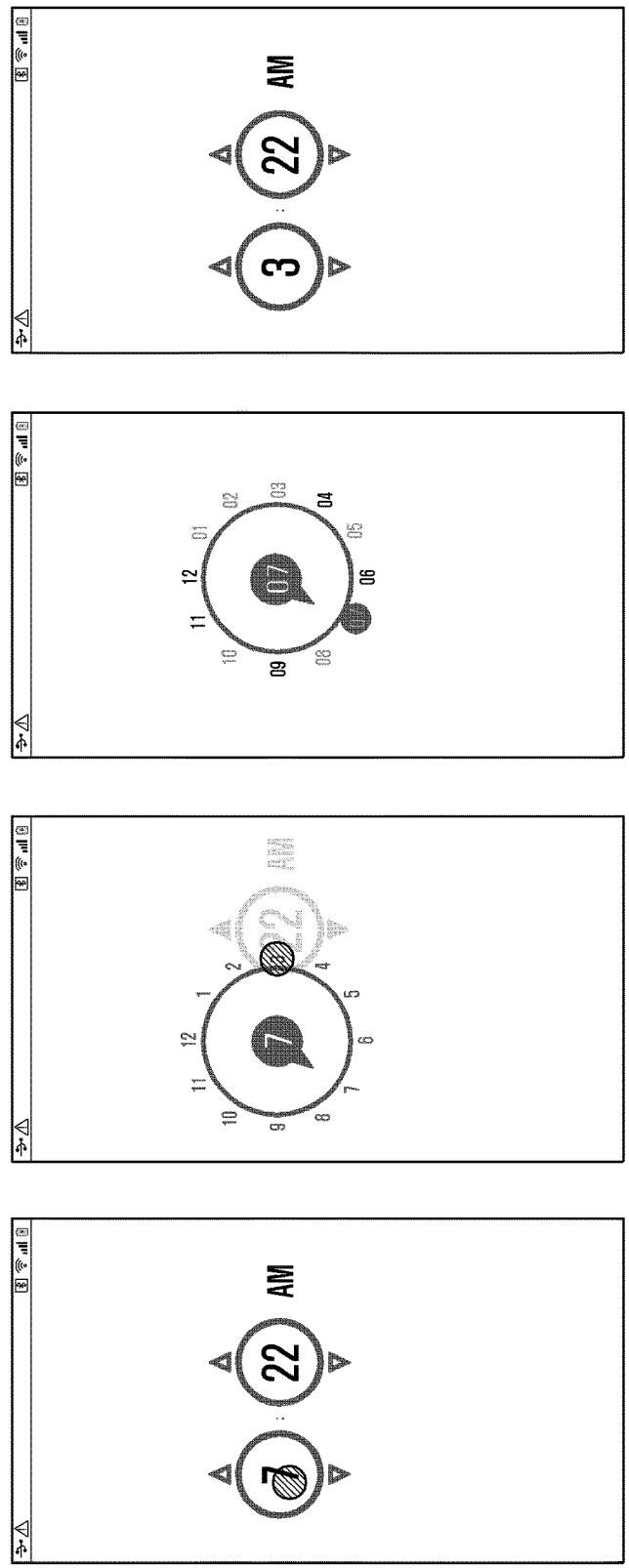
Figure 4C:
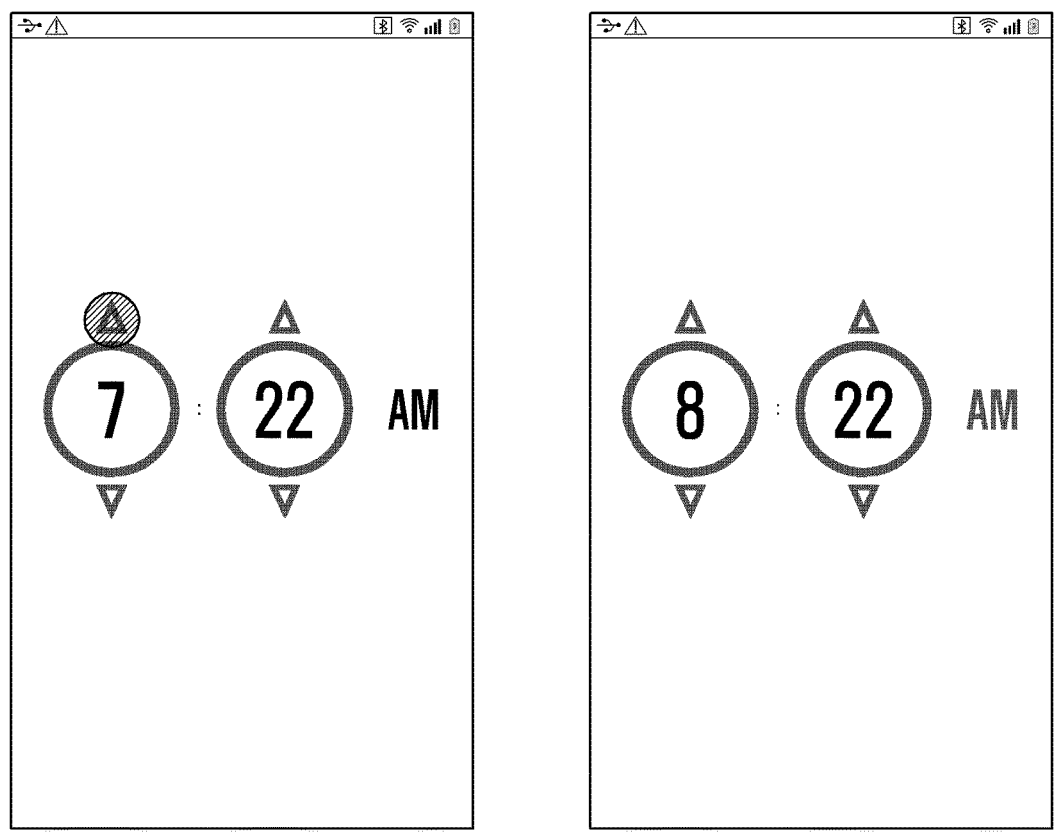
Figure 4D:
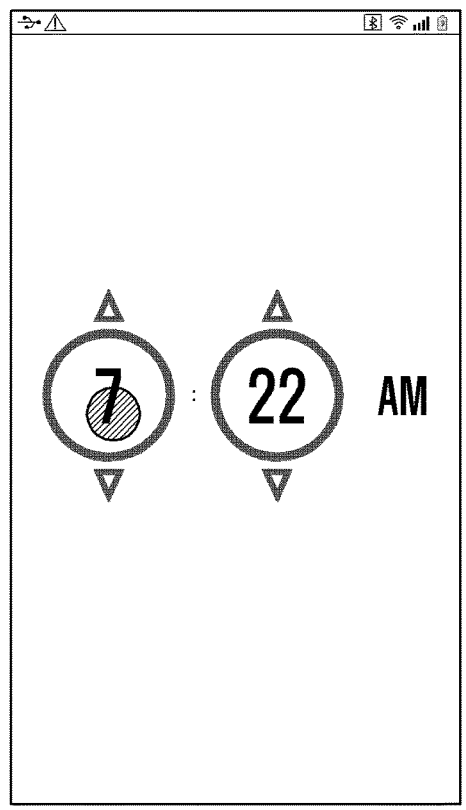
Figure 4D:
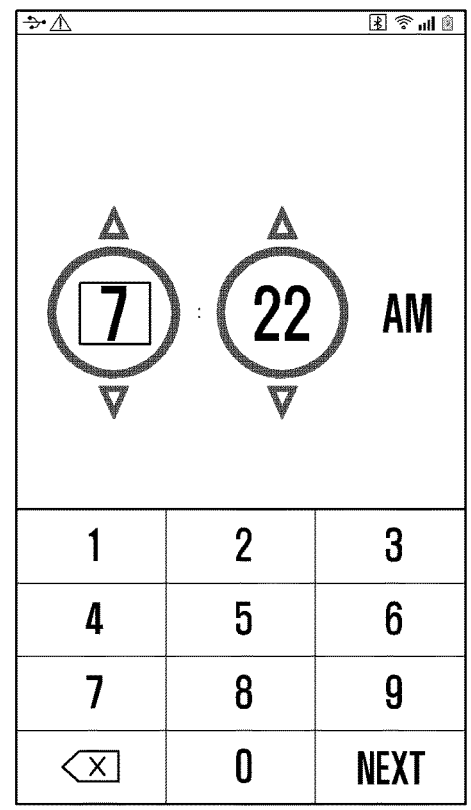

FIGS. 3A and 3B are flowcharts illustrating a process of inputting a time according to an embodiment of the present invention, and FIGS. 4A and 4D illustrate examples of screens displayed while inputting a time according to an embodiment of the present invention.

Referring to FIGS. 3A, 3B, and 4A, in step 301, a time is displayed, as illustrated in screen 410 of FIG. 4A, by executing an alarm application.

In step 303, the controller 140 determines whether a first number of the displayed time is selected. Here, the first number refers to a number arbitrarily selected by the user from the displayed numbers, and may be an hour, a minute, or a second. For example, as illustrated in screen 411, the selection of the first number may be made through a touch of the display number.

If the first number is not selected, the controller 140 determines whether the display of the time has ended in step 327.

However, if the first number is selected in step 303, the controller 140 determines the attribute of the selected first number in step 305.

In step 307, the controller 140 determines whether the selected first number corresponds to an 'hour'. When the selected first number corresponds to an 'hour', the controller 140 displays an expanded menu for changing the selected number with an attribute corresponding to 'hour', as illustrated in screen 411 in the foreground layer, in step 309. As illustrated in screen 411 of FIG. 4A, in the expanded menu, the numbers corresponding to the attribute of 'hour', which is the selected first number, are displayed in a circle around the selected first number.

Figure 5:
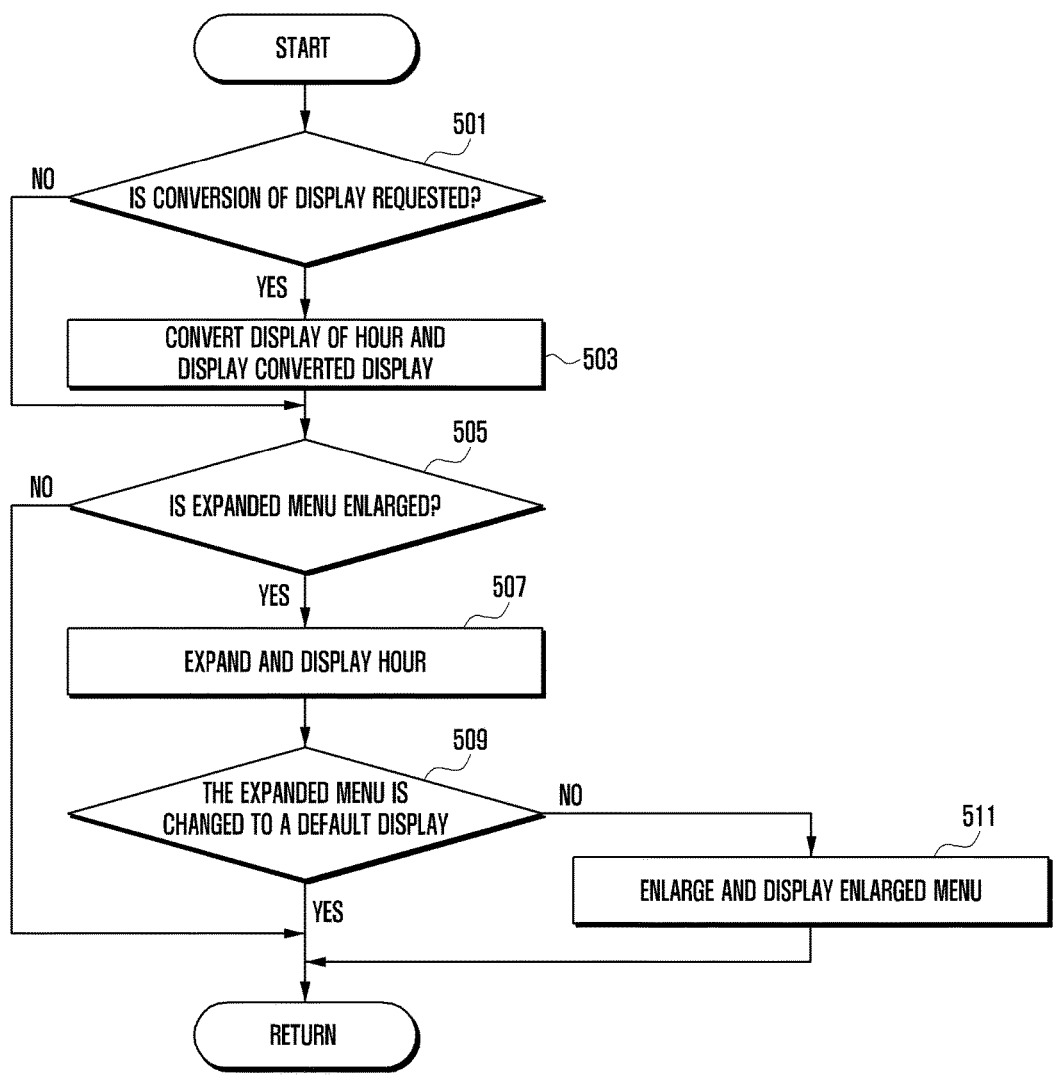
FIG. 5 is a flowchart illustrating a process of inputting an hour according to an embodiment of the present invention.
Figure 6A:
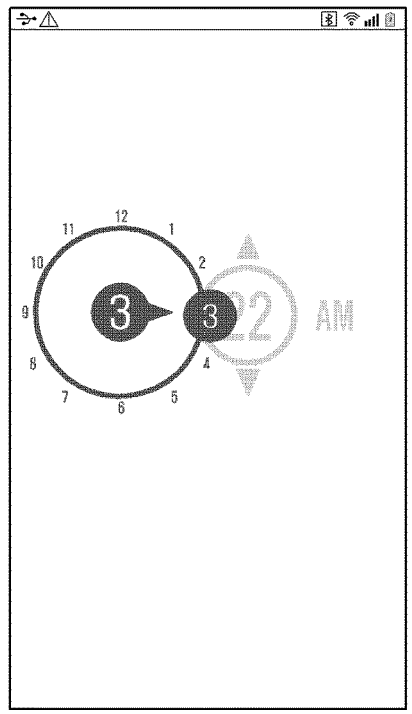
FIGS. 6A to 6C illustrate examples of screens displayed while inputting an hour according to an embodiment of the present invention.
Figure 6A:
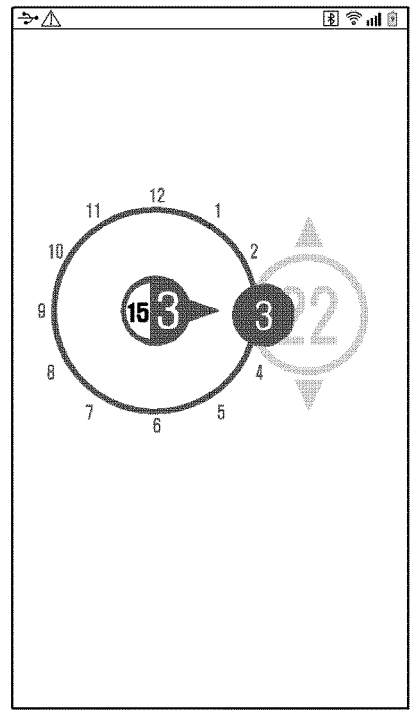
Figure 6A:
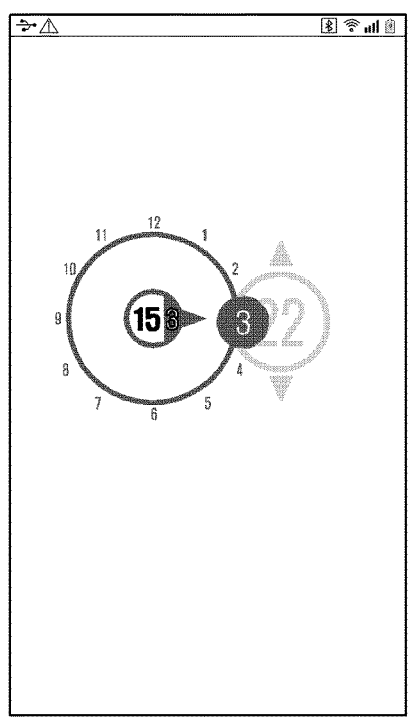
Figure 6A:
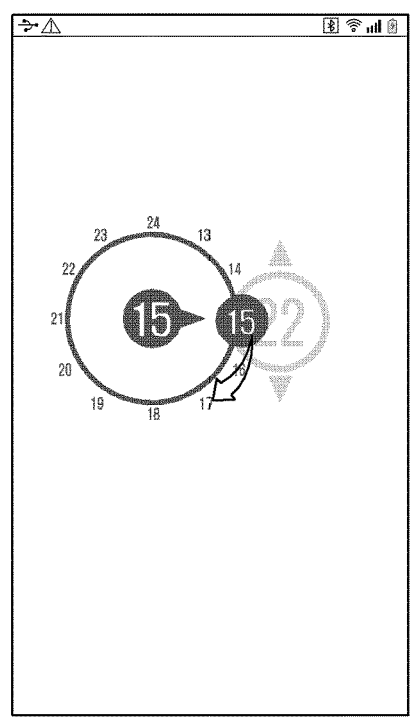
Figure 6B:
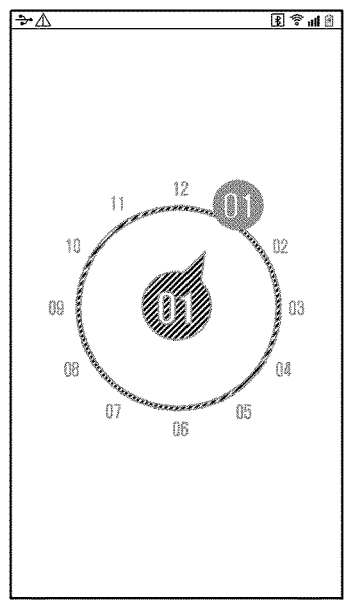
Figure 6B:
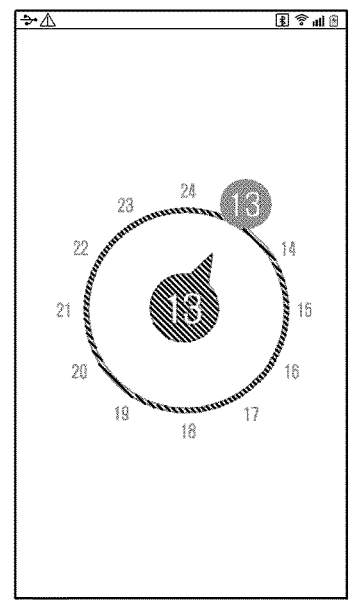
Figure 6B:
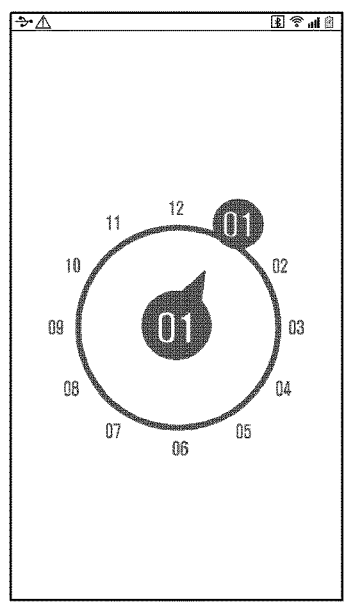
Figure 6B:
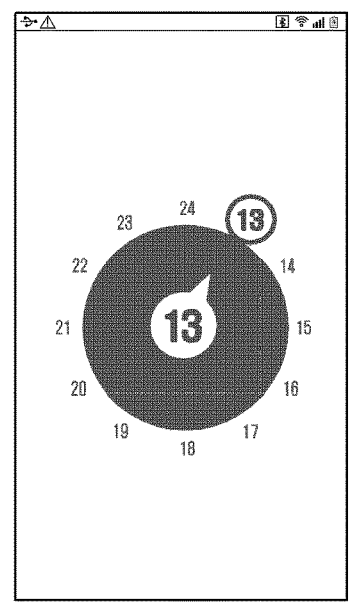
Figure 6C:
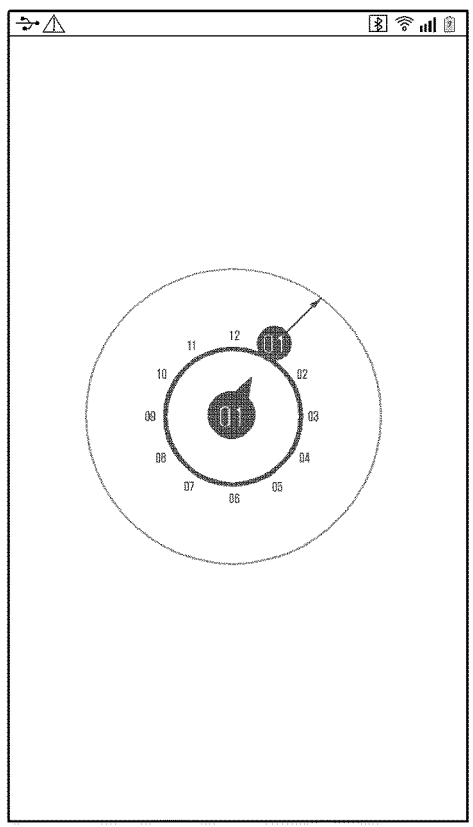
Figure 6C:
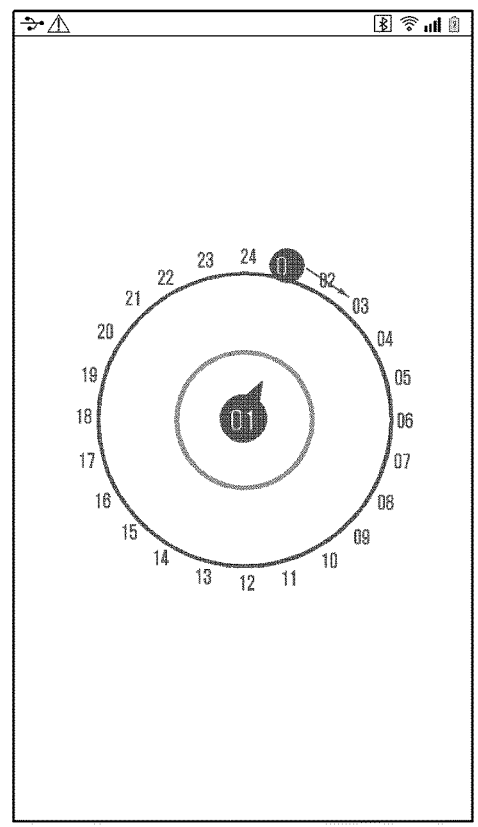

FIG. 5 is a flowchart illustrating a process of inputting an hour according to an embodiment of the present invention, and FIGS. 6A to 6C illustrate examples of screens displayed while inputting an hour according to an embodiment of the present invention.

Referring to FIGS. 5 and 6A to 6C, the controller 140 determines whether a request for conversion of the display of the 'hour' in step 501. Here, the request for conversion of the display of 'hour' may be a request for conversion by which the unit of 12 hours will be converted to 24 hours. For example, the unit of 12 hours may cause 1 a.m. and 1 p.m. to be displayed as 1 in the same manner. Further, the unit of 24 hours may allow 1 a.m. to be displayed as 1 and allow 1 p.m. to be displayed as 13. Accordingly, the user may display time in units of 12 hours or 24 hours according to personal preference.

For example, while the unit of 12 hours is displayed, as illustrated in screen 610, the controller 140 may detect a request for conversion of display of the first number (for example, 3) corresponding to 'hour'. As described above, the request for conversion of the display may be a hold, a long touch, a long press, a double touch, a double tap, etc.

If a request for conversion of display of the first number (for example, 3) corresponding to 'hour' is detected, the controller 140 displays a unit for selecting numbers corresponding to a.m. and a unit for selecting numbers corresponding to p.m. together, as illustrated in screen 611. For example, the unit for selecting numbers corresponding to a.m. may be numbers of 1 to 12, such that 1 a.m. to 12 a.m. may be selected. The unit for selecting numbers corresponding to p.m. may be 13 to 24 such that 1 p.m. (13) to 12 p.m. (24) may be selected. That is, the controller 140 may display the number '3' corresponding to 3 p.m. when the unit of 12 hours is set and may display the number '15' corresponding to 3 p.m. when the unit of 24 hours is set. Accordingly, if the user inputs a touch and drags the touch towards the right by a predetermined distance while 3 and 15 are displayed together, a 3 area (in the case of the unit of 12 hours) may be widely displayed as illustrated in screen 612.

While 3 and 15 are displayed together, the controller 140 may detect the left/right movement of the touch point to display the expanded menu in units of 12 hours or 24 hours. If the touch point is moved to the left, the controller 140 may display an expanded menu in the units of 24 hours, as illustrated in screen 613, in step 503.

For example, after setting the units of the expanded menu, the controller 140 may display screen 620 of FIG. 6B, i.e., in units of 12 hours, in red, and may display screen 621, i.e., in units of 24 hours, in blue, to display the expanded menu in different colors. As another example, the controller 140 may reverse the color (for example, black/white reversal) when the display of 'hour' is converted as in screens 622 and 623.

While the expanded menu is displayed in units of 12 hours, e.g., as illustrated in screen 630 of FIG. 6C, the controller 140 determines whether the size of the expanded menu formed by dragging the touch point outwards is expanded in step 505. If the expanded menu is not enlarged, the process returns to step 309 of FIG. 3.

However, if the expanded menu is expanded, e.g., dragged outwards, in step 505, the controller 140 expands the numbers of the expanded menu to display the numbers.

Screen 630 illustrates an example of expanding the numbers of the expanded menu. Specifically, as illustrated in screen 630, the controller 140 detects a drag towards the outside of the expanded menu, while the expanded menu is displayed in units of 12 hours.

If a drag towards the outside of the expanded menu is detected, as illustrated in screen 630, the controller 140 expands the size of the expanded menu, as illustrated in screen 631, and expands the range of the number corresponding to 'hour' that is the selected first number to display the expanded range at the same time. That is, the controller 140 may expand the range of 'hour' such that hours 1 to 24 may be displayed, while only hours 1 to 12 were previously displayed.

Similarly, if the expanded menu is dragged inwards, the numbers of the expanded menu may be reduced and displayed. Accordingly, the controller 140 may expand or reduce the expanded menu in response to an input, e.g., a drag.

While the size of the expanded menu is expanded in step 507, the controller 140 determines whether the expanded menu is changed to a default display in step 509. If the expanded menu is changed to a default display in step 509, the controller 140 displays the expanded menu in its original size and the process returns to step 309 of FIG. 3.

However, if the expanded menu is not changed to a default display in step 511, the controller 140 continues to display the expanded menu.

Referring again to FIGS. 3A, 3B, and 4A, while the expanded menu is displayed in step 309, as illustrated in screen 411, the controller 140 determines whether a second number is selected by the user in step 311. Here, the second number is a number arbitrarily selected from the numbers displayed in the expanded menu by the user. For example, the user may select the second number through a drag from the first number to the second number displayed on the expanded menu.

The controller 140 may detect the drag from the first number to the second number, as illustrated in screen 411 of FIG. 4A. That is, if the selected first number is touched and is dragged by a predetermined distance without releasing the touch, and the touch is released over any number of the expanded menu, the number the touch is released over is selected as the second number.

If the second number is selected in step 311, the controller 140 changes the first number to the second number in step 313, as illustrated in screen 412.

In step 315, the controller 140 ends the display of the foreground layer, in step 315, and displays the second number (for example, 3 changed from 7) obtained by changing the first number and an unselected number (a minute number of the background layer) together, as illustrated in screen 413.

FIG. 4B illustrate examples of screens displayed while inputting time according to an embodiment of the present invention.

Referring to FIG. 4B, while time is displayed, as illustrated in screen 420, selection of the first number (for example, an hour) is detected. For example, the first number may be selected by releasing the touch if the expanded menu appears while any number is touched while the time is displayed.

After the first number is selected, the controller 140 determines the extended menu for changing the first number with an attribute corresponding to the first number (for example, 'hour') and displays the extended menu in the foreground layer, as illustrated in screen 421. The expanded menu may be displayed for a predetermined time period. The range of the numbers corresponding to the 'hour' that is the selected first number may be displayed in a circle around the selected first number.

Additionally, in the expanded menu, a frequently set time or a time currently present in an alarm list may be displayed with the size of a font, a highlight, or a thickness of a letter as illustrated in screen 422.

After the selection of the second number (3) is detected in the expanded menu, the controller 140 changes the first number to the changed second number, and displays the changed number and an unselected number (i.e., the minutes number) together.

FIG. 4B illustrate examples of screens displayed while inputting time according to an embodiment of the present invention. Specifically, FIG. 4C illustrates an embodiment of inputting time using an arrow.

Referring to FIG. 4C, the controller 140 displays a time and arrows together as illustrated in screen 430. Further, a time may be input by pressing an arrow button. If one pressing an up arrow button (or + button) over the hour number is detected, while 7:22 is displayed, as illustrated in screen 430, the controller 140 displays 8:22, as illustrated in screen 431.

FIG. 4D illustrates examples of screens displayed while inputting time according to an embodiment of the present invention. Specifically, FIG. 4D illustrates an embodiment of inputting time through a keypad.

Referring to FIG. 4D, if selection of 'time' is detected while time is displayed as illustrated in screen 440, the controller 140 may detect input of a number by displaying a keypad as illustrated in screen 441.

As described above, the hour number may be input and displayed in various methods.

The controller 140 determines whether the first number corresponds to selection of a 'minute' in step 317.

Referring to FIGS. 3A and 3B, if the controller 140 determines whether the first number corresponds to selection of a 'minute' in step 317, the controller 140 displays the expanded menu corresponding to the minute in the foreground layer in step 319. Similar to the expanded menu for the hour, the expanded menu corresponding to the minute is displayed in a circle around the selected first number.

Figure 7:
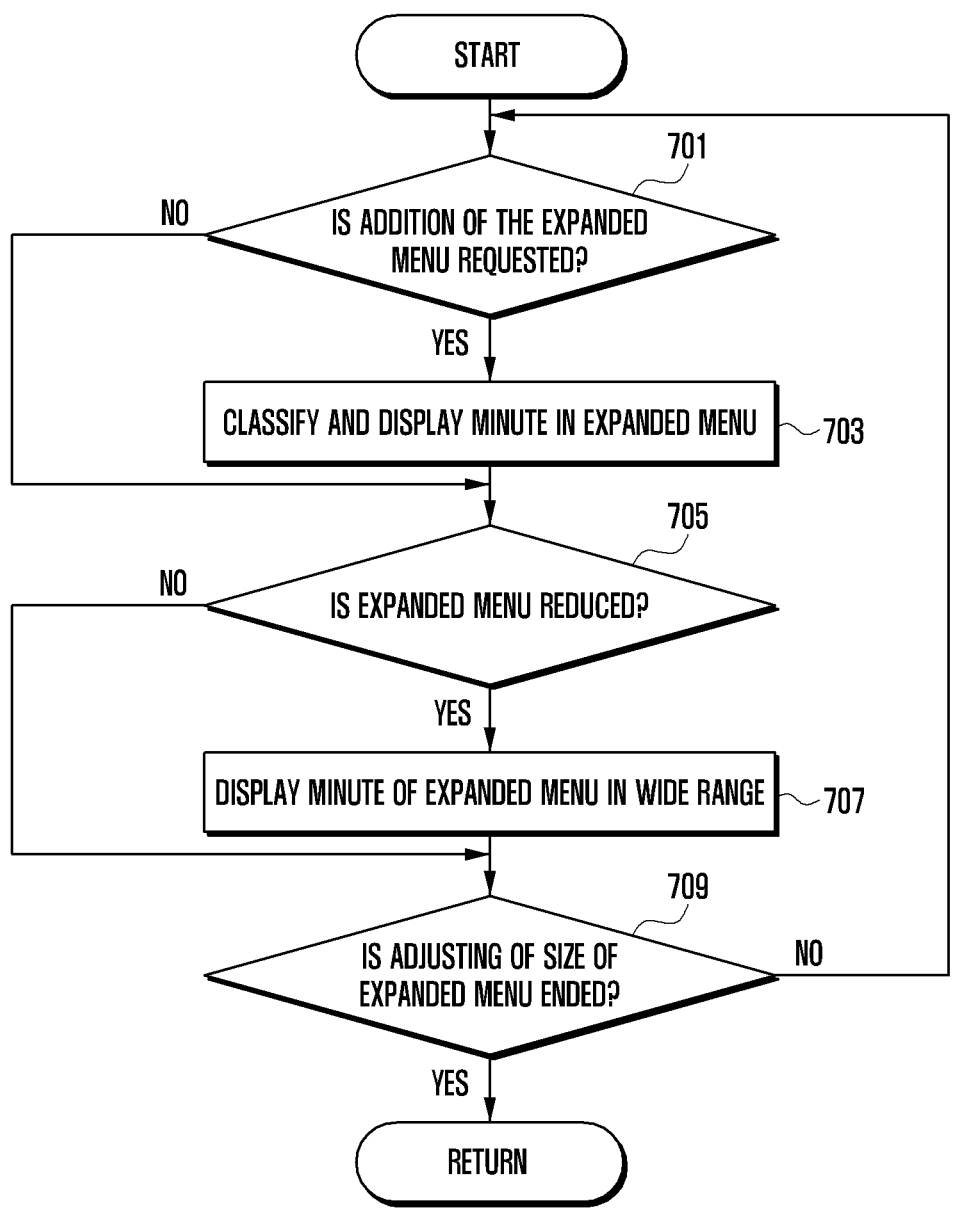
FIG. 7 is a flowchart illustrating a process of inputting a minute according to an embodiment of the present invention.
Figure 8:
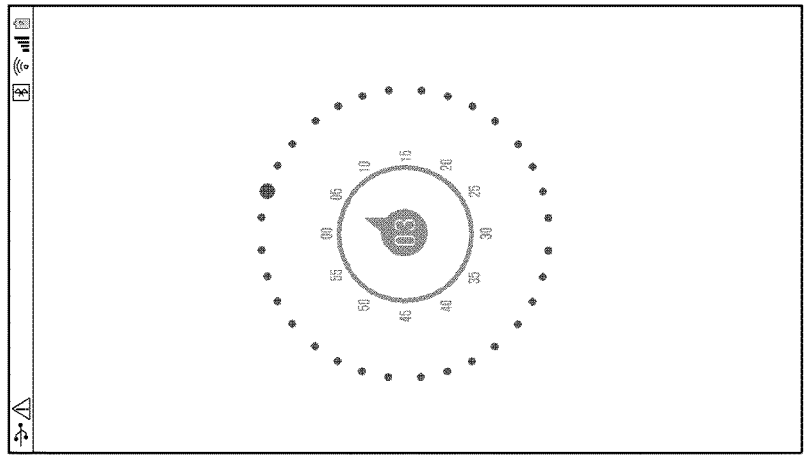
FIG. 8 illustrates examples of screens displayed while inputting a minute according to an embodiment of the present invention.
Figure 8:
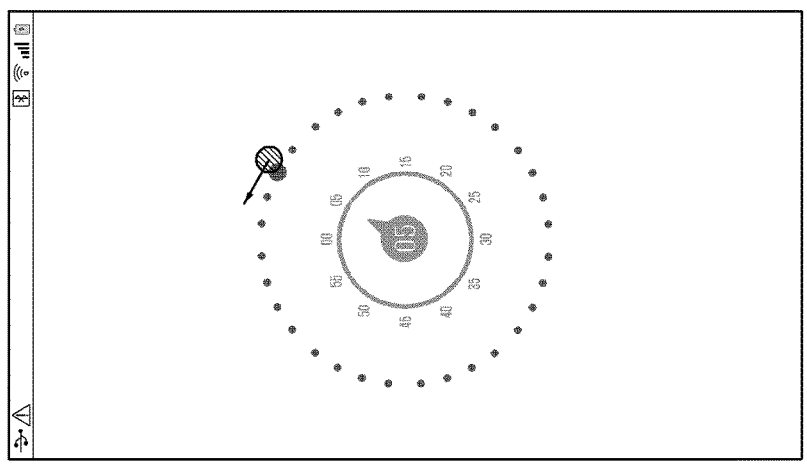
Figure 8:
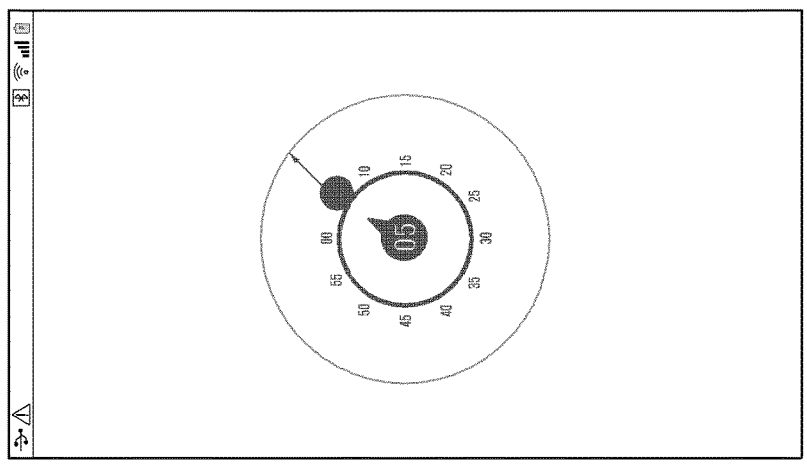

FIG. 7 is a flowchart illustrating a process of inputting minutes according to an embodiment of the present invention, and FIG. 8 illustrates examples of screens displayed while inputting a minute according to an embodiment of the present invention.

Referring to FIGS. 7 and 8, the controller 140 determines whether a request for addition of the expanded menu in step 701. Here, the addition of the expanded menu means that at least one expanded menu is displayed by constituting the foreground layer in multiple layers if the expanded menu is dragged outwards while the foreground is enabled by detecting the selection of the first number. For example, the addition of the expanded menu creates a plurality of expanded menus.

If a drag (an operation of not releasing a touch after a touch is made and moving outwards by a predetermined distance) for adding the expanded menu, as illustrated in screen 810, is input, the expanded menu for the minute may be displayed as illustrated in screen 811, in step 703. That is, screen 810 displays a unit of 5 minutes in a range of numbers in the expanded menu corresponding to the minute, and in screen 811, the expanded menu enlarged to display the minutes in units of 1 minute. The expanded menu enlarged of the screen 811 may include 60 point for each minute. The points displayed in screen 811 refer to numbers in units of 1 minute. The controller 140 detects a request for changing the selected number in the screen 811, the controller 140 display the screen 812. For example, the controller 140 changes the selected number from 5 to 3.

Accordingly, the controller 140 may display the minutes in units of 5 minutes or 1 minutes through a drag operation.

While the expanded menu includes minutes displayed in units of 1 minute, the controller 140 determines whether the expanded menu is reduced in step 705. When the expanded menu is reduced in step 705, the controller 140 reduces the expanded menu, as illustrated in screen 810, to display the expanded menu in units of 5 minutes in step 707.

Although the screens in FIG. 8 illustrate examples of units of 5 minutes and units of 1 minute, other units, e.g., 15 minutes, 20 minutes, etc., may be used.

In step 709, the controller 140 determines whether adjusting the size of the expanded menu has ended. If it is detected in step 709 that the adjusting of the size of the expanded menu has ended, the process returns to step 319 of FIG. 3B.

For example, the ending of the adjusting of the size of the expanded menu may be selection of the second number in the expanded menu.

While the expanded menu corresponding to 'minute' is displayed in the foreground layer, the controller 140 determines whether the second number is selected in step 321. If selection of the second number is not detected in the expanded menu, the controller 140 displays the expanded menu corresponding to 'minute' that is the selected first number in the foreground layer for a predetermined time period in step 319.

However, if the selection of the second number is detected in the expanded menu in step 321, the controller 140 displays replaces the selected first number with the selected second number in step 323.

In step 325, the controller 140 displays the changed second number from the foreground layer together with a number of a background layer, i.e., an hour number, in step 325.

If a request for ending the display of the time is detected in step 327, the controller 140 ends display of time. For example, the request for ending display of time may be ending an alarm application.

However, if a request of ending of display of the time is not detected, the process returns to step 301.

Figure 9:
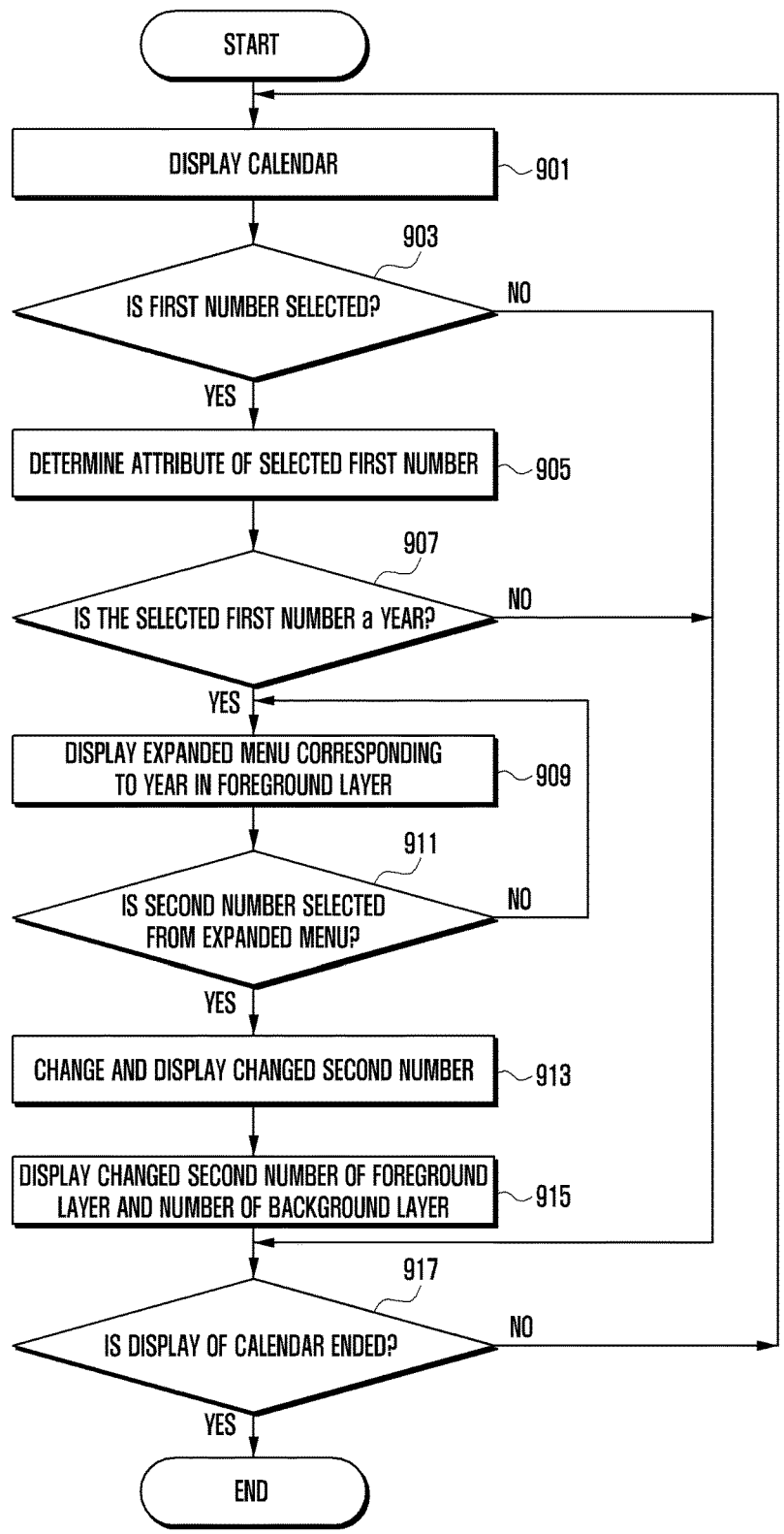
FIG. 9 is a flowchart illustrating a process of inputting a year according to an embodiment of the present invention.
Figure 10:
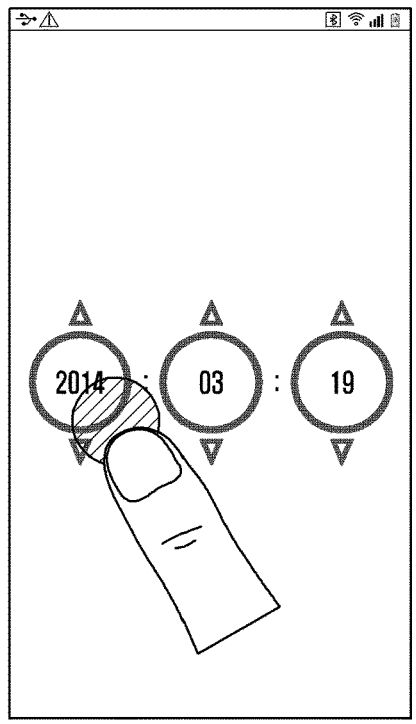
FIG. 10 illustrates examples of screens displayed while inputting a year according to an embodiment of the present invention.
Figure 10:
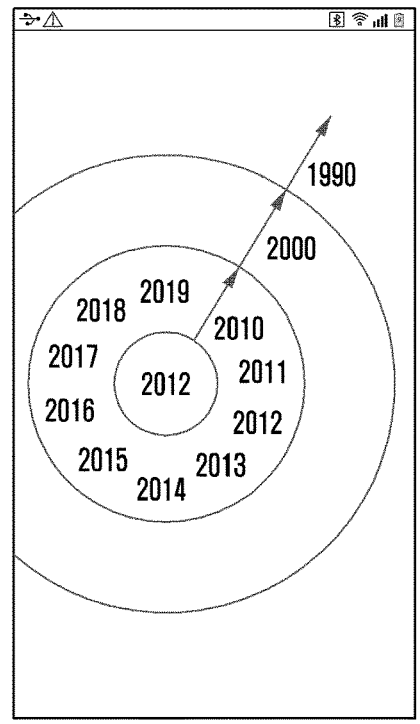
Figure 10:
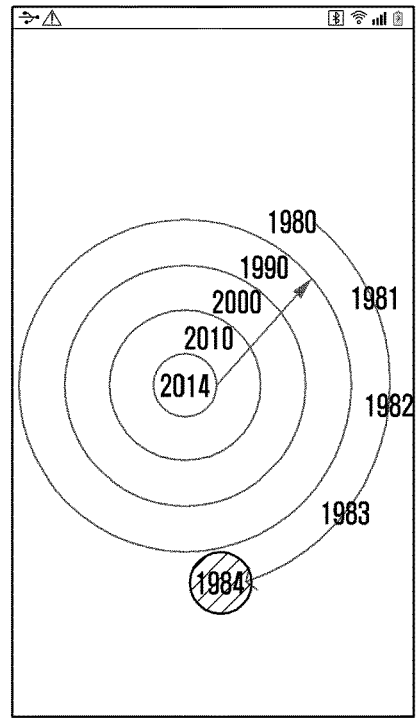
Figure 10:
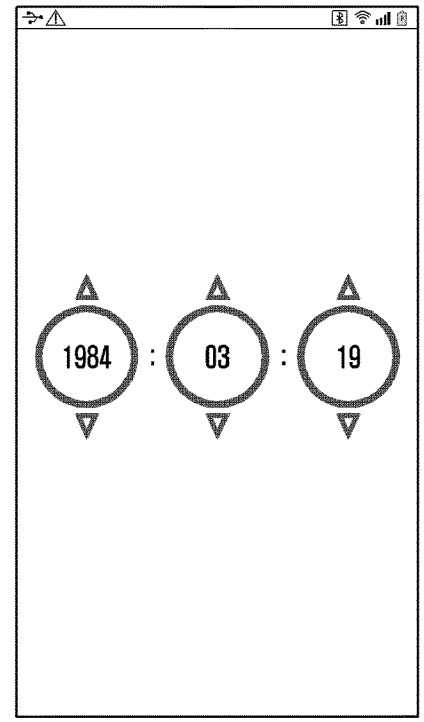

FIG. 9 is a flowchart illustrating a process of inputting a year according to an embodiment of the present invention, and FIG. 10 illustrates examples of screens displayed while inputting a year according to an embodiment of the present invention.

Referring to FIGS. 9 and 10, the controller 140 displays a calendar, as illustrated in screen 1001, as a calendar application is executed in step 901. As illustrated in screen 1001, the calendar may include year, month, and day.

In step 903, the controller 140 determines whether a first number is selected from the numbers displayed in the calendar. If the first number is selected, as illustrated in screen 1001, the controller 140 determines the attribute of the selected first number as a year in step 905.

The controller 140 determines whether the selected first number is a year.

In step 909, if the controller determines that the selected first number is a year, the controller 140 displays the expanded menu corresponding to a year, as illustrated in screen 1002.

As illustrated in screen 1002, at least one number corresponding to the selected first number (that is, a year) may be displayed in a circle in the foreground layer in the expanded menu, around the selected first number 2012. In FIG. 10, each layer displays years in units of ten years. Accordingly, if a user drags towards the outside of the expanded menu, multiple layers may be displayed in units of ten years as illustrated in screen 1002.

At the same time, the controller 140 may blur the numbers, i.e., the month and the day, that have not been selected in the background layer in step 903. Further, the background layer may be disabled such that a user input may not be detected therein.

While the expanded menu corresponding to 'year' is displayed, in step 911, the controller 140 determines whether a second number is selected from the numbers displayed in the expanded menu, as illustrated in screen 1003. Here, the second number refers to a number selected from the numbers of the expanded menu. Referring to screen 1003, after the first number is touched, the controller 140 displays multiple layers, without the user releasing the touch, and selects the second number when the user releases the touch on a number (for example, 1984).

After the multiple layer is displayed, the controller 140 replaces the first number selected from the calendar with the second number selected by the user in step 913.

In step 915, the controller 140 ends the display of the foreground layer, and displays the changed second number with the non-selected numbers (i.e., the month and the day) in the background layer, as illustrated in screen 1004.

In step 917, the controller 140 determines whether the display of the calendar has ended, and repeats steps 901 to 915 until the display of the calendar has ended.

Figure 11:
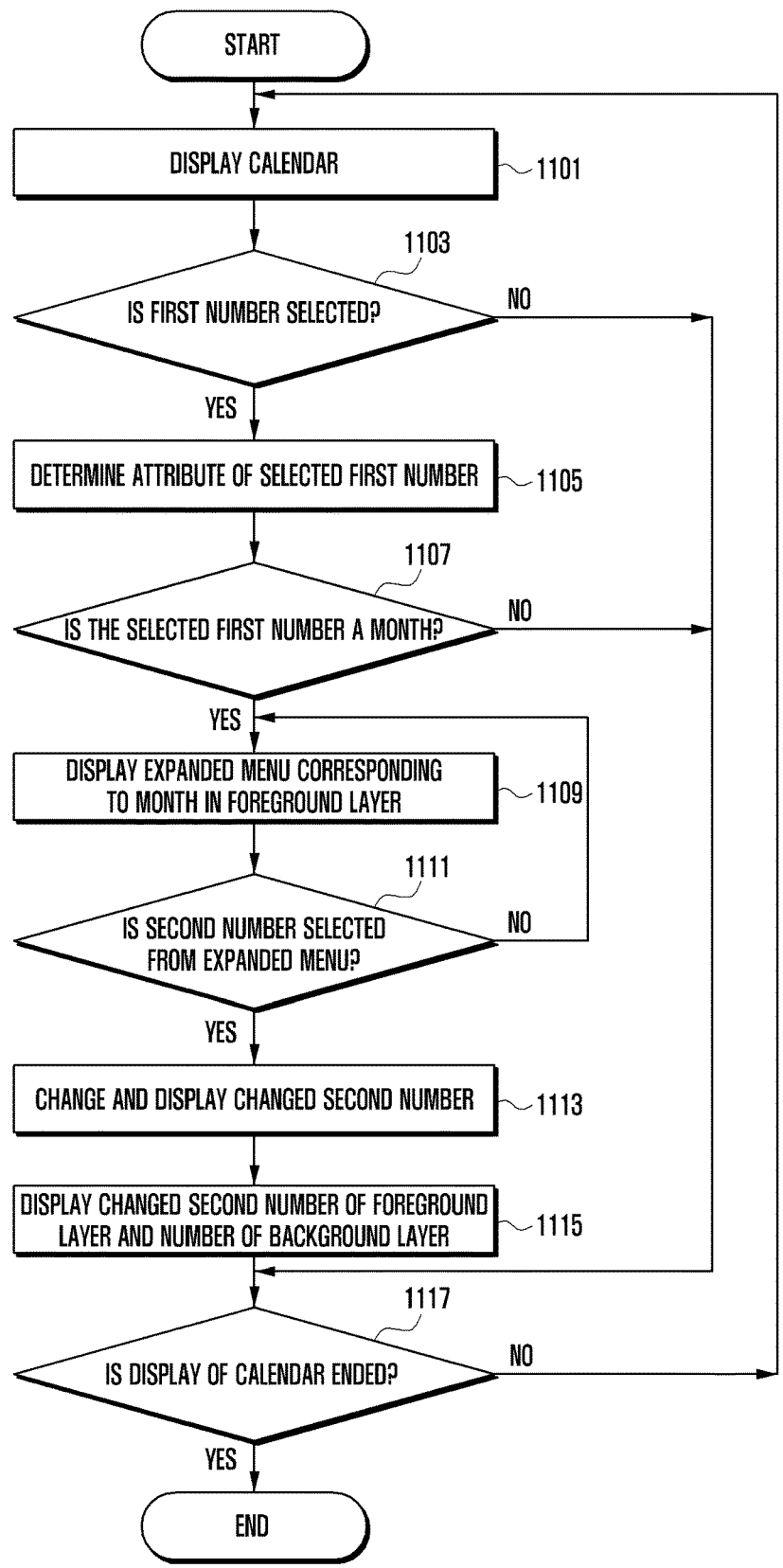
FIG. 11 is a flowchart illustrating a process of inputting a month according to an embodiment of the present invention.

FIG. 11 is a flowchart illustrating a process of inputting months according to an embodiment of the present invention.

Referring to FIG. 11, the controller 140 displays a calendar including at least one number in step 1101. If a selection of a first number from the calendar is detected in step 1103, the controller 140 determines an attribute of the selected first number as a month in step 1105.

In step 1107, the controller 140 determines whether the selected first number is month.

In step 1109, the controller 140 displays an expanded menu corresponding to the month in a foreground layer, i.e., over the calendar displayed in a background layer, in step 1109.

At the same time, the controller 140 may disable the numbers that have not been selected (e.g., the day and the year) from the calendar displayed in the background layer.

While the expanded menu corresponding to the month is displayed, the controller 140 determines if a second number is selected from the numbers included in the expanded menu in step 1111.

If the second number is selected in step 1111, the controller 140 replaces the first number with the selected second number in step 1113.

In step 1115, the controller 140 displays the changed second number from the foreground layer together with the unselected numbers of a background layer (the day and the year).

In step 1117, the controller 140 determines whether the display of the calendar has ended, and if the display of the calendar has not ended, the process returns to step 1101.

Figure 12:
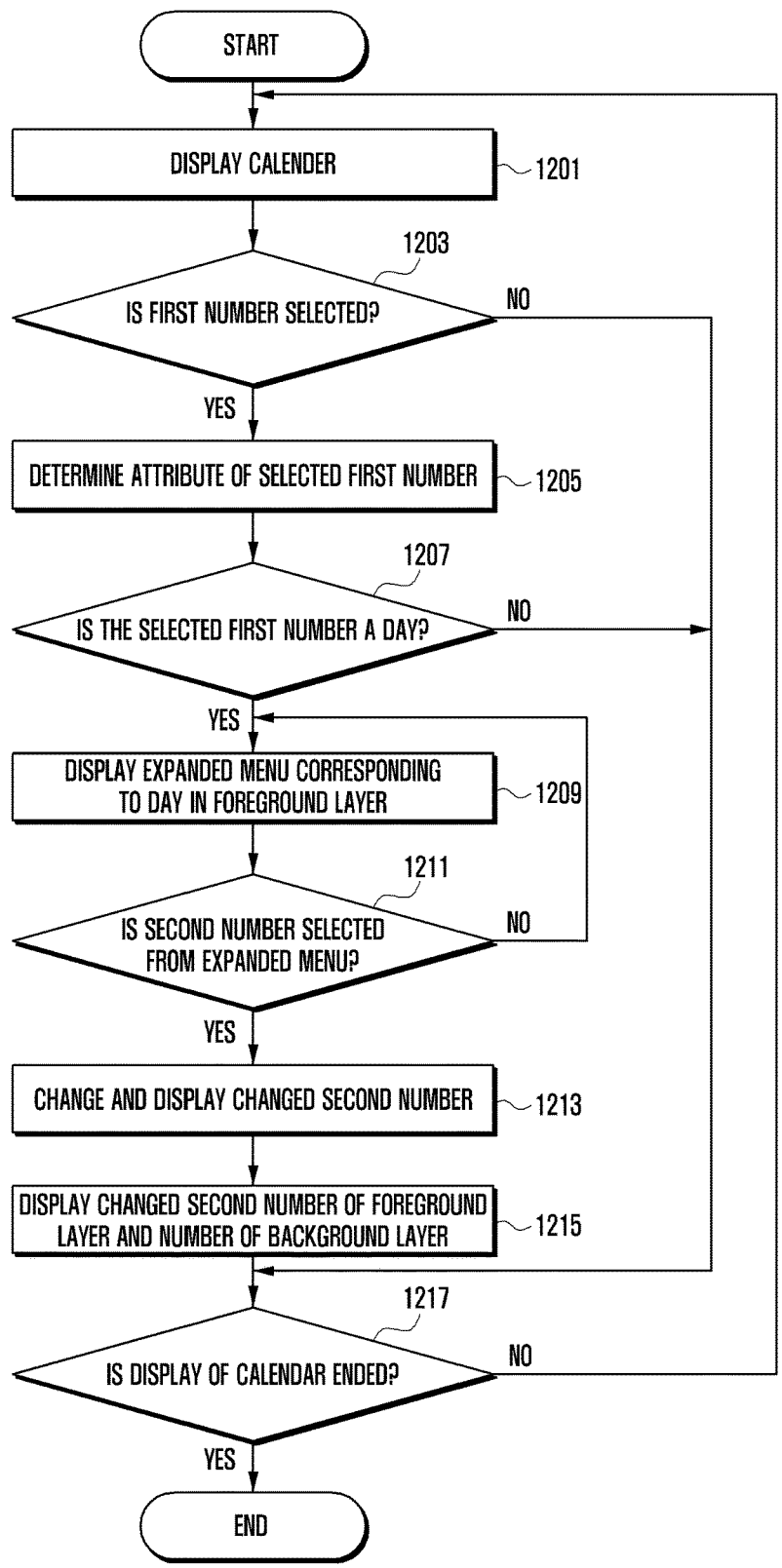
FIG. 12 is a flowchart illustrating a process of inputting a day according to an embodiment of the present invention.
Figure 13:
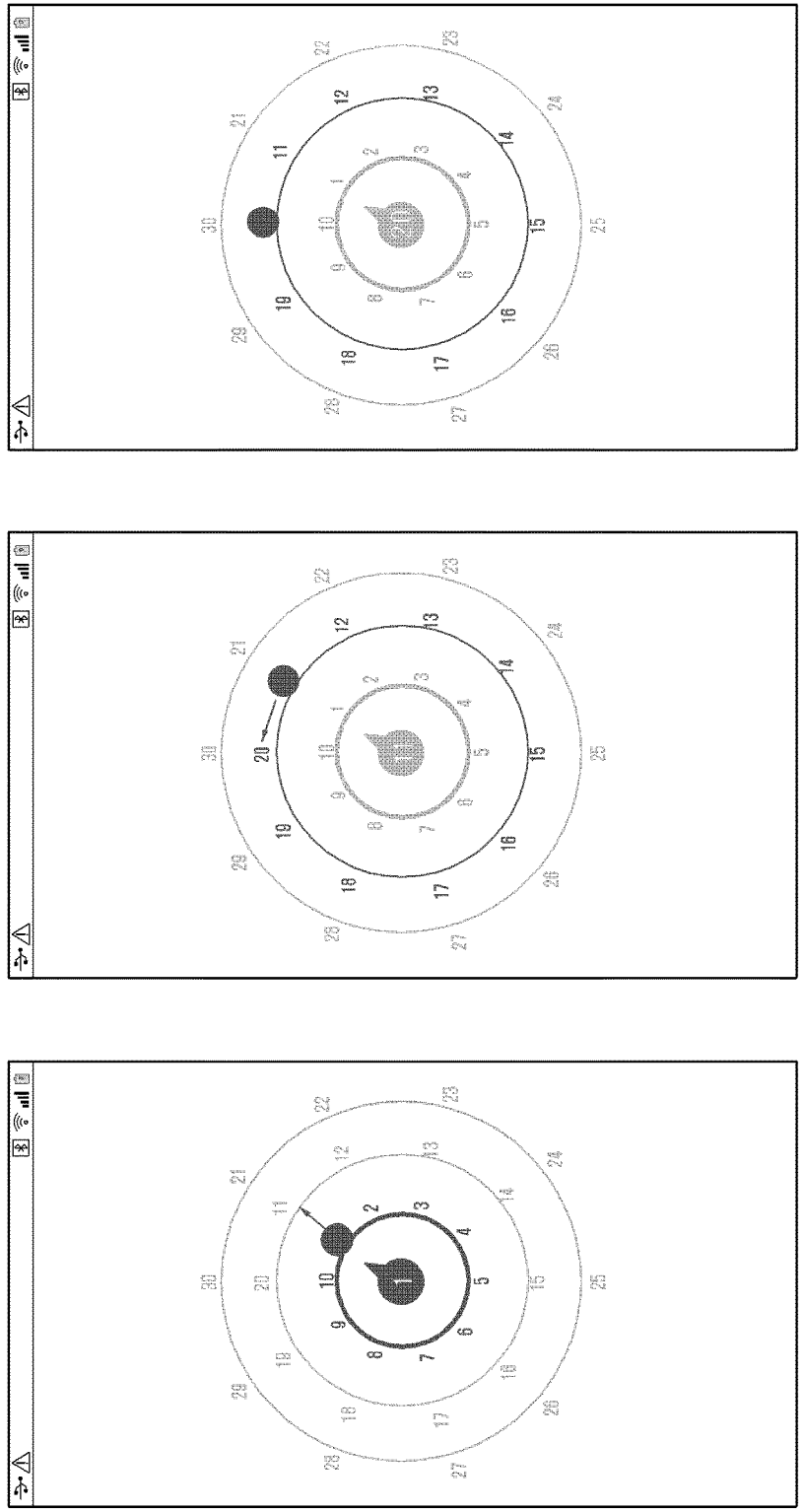
FIG. 13 illustrates examples of screens displayed while inputting a day according to an embodiment of the present invention.

FIG. 12 is a flowchart illustrating a process of inputting days according to an embodiment of the present invention, and FIG. 13 illustrates examples of screens displayed while inputting a day according to an embodiment of the present invention.

Referring to FIGS. 12 and 13, the controller 140 displays a calendar, for example, as a calendar application is executed, in step 1201. Here, the calendar may include at least one number.

In step 1203, the controller 140 determines if a first number is selected from the calendar. For example, the first number may be 'year, month, and day' to correspond to the calendar.

If the selection of the first number is detected, the controller 140 determines an attribute of the selected first number as a day in step 1205.

In step 1307, the controller 140 determines whether the selected first number is day.

In step 1209, the controller 140 displays the expanded menu corresponding to the day in a foreground layer, i.e., over the calendar displayed in a background image.

At the same time, the controller 140 may disable the numbers that have not been selected from the calendar (i.e., the month and the year) in the background layer to blur the numbers.

As illustrated in FIG. 13, the expanded menu corresponding to the day includes various units circularly according to an attribute of the day. The attribute of 'day' may include 1 to 31. Accordingly, the numbers corresponding to the day in units of at least 10 days may be displayed in one expanded menu.

Referring to screen 1301, the controller 140 displays days 1 to 10 in the expanded layer closest to '1', i.e., the first number selected from the calendar to display 1 to 10. Days 11 to 20 are displayed in the expanded layer corresponding to the next location, and days 21 to 31 are displayed in the expanded layer corresponding to the next location.

In this way, the expanded menus may be included in one layer, and only one expanded menu may be included in the one layer. If a drag towards the outside of the expanded menu displaying days 1 to 10 is detected in screen 1301, the controller 140 may highlight the expanded menu layer displaying days 11 to 20, such that days 11 to 20 may be selected, as illustrated in screen 1302. If a drag further towards the outside of the expanded menu is detected, the controller 140 may highlight the expanded menu layer displaying days 21 to 31.

In step 1211, the controller 140 determines if a user selects a second number from the expanded menu as displayed in screen 1302.

For example, referring to screen 1302, when the user releases the touch to select the second number from the numbers of days 11 to 20, after the touch is moved by a predetermined distance, without releasing the touch, while the expanded menu displaying 11 to 20 is displayed, the controller 140 determines the number over which the touch was released as the selected second number. If the second number is selected by releasing the touch over day 20, as illustrated in screen 1303, the controller 140 replace the first selected number with the selected second number in step 1213.

Thereafter, in step 1215, the controller 140 ends the display of the foreground layer and displays the selected second number together with the non-selected numbers of a background layer (the month and the year).

In step 1217, the controller 140 determines of displaying the calendar has ended, and repeats the above steps until the display of the calendar has ended.

An electronic device according to an embodiment of the present invention can control input of numbers such as a data and a time using an user interface through which numbers may be input. The electronic device may be utilized for marketing or a uniqueness of design through a new user interface with an iconic design.

Although an example of a process of limitedly selecting and inputting year, month, and day while the calendar is displayed has been described, inputs of year, month, and day may be freely made without limitation.

While the present invention has been particularly shown and described with reference to certain embodiments thereof, it will be understood by those of ordinary skill in the art that various changes in form and details may be made therein without departing from the spirit and scope of the present invention as defined by the following claims and their equivalents.

What is claimed is:

1. A method of providing a user interface screen of an electronic device, the method comprising:
    displaying, by a display of the electronic device, a user interface screen including a first number of at least one number;
    detecting a first user gesture on the user interface screen;
    in response to detecting the first user gesture on the user interface screen, determining a unit of measurement of the first number and changing the user interface screen to display a first arrangement of additional numbers, included in a first number range;
    detecting a second user gesture on the user interface screen; and
    displaying, in response to detecting the second user gesture on the user interface screen including the first arrangement, a second arrangement of additional numbers included in a second number range and a third arrangement of additional numbers included in a third number range,
    wherein the first user gesture is a long touch and the second user gesture is a drag input, and the first user gesture and the second user gesture are continuously inputted on the user interface screen,
    wherein the second number range and the third number range are changed depending on a dragged length of the drag input of the second user gesture, and
    wherein the first number range, the second number range, and third number range do not overlap each other, and the second number range and the third number range are each scaled in the determined unit of measurement of the first number.

2. The method of claim 1, wherein the first user gesture is an input for selecting one of the at least one number,
    wherein changing the user interface screen to display the first arrangement of additional numbers comprises displaying the first arrangement and the selected number in a foreground layer of the user interface screen, and
    wherein the foreground layer covers the displayed at least one number in a background layer of the user interface screen.

3. The method of claim 1, wherein the first user gesture is an input for selecting one of the at least one number, and
    wherein changing the user interface screen to display the first arrangement of additional numbers comprises displaying the first arrangement of additional numbers in a form surrounding the selected number.

4. The method of claim 1, further comprising detecting a drag input from one of the at least one number to one of the numbers included in the first arrangement or the second arrangement.

5. The method of claim 1, wherein the first user gesture is a long press input for selecting one of the displayed at least one number,
    further comprising detecting a tap input for selecting one of the numbers included in the first arrangement or the second arrangement.

6. The method of claim 1, wherein the second user gesture is a touch input dragging the first arrangement outwards.

7. The method of claim 1, wherein changing the user interface screen to display the first arrangement of additional numbers comprises displaying the user interface screen through multiple layers.

8. The method of claim 1, wherein the at least one number comprises a digital time display including an hour number and a minute number,
    wherein the first user gesture is an input for selecting the hour number, and
    wherein the first arrangement of additional numbers comprises numbers associated with units of 12 hours or 24 hours corresponding to an attribute of the hour number.

9. The method of claim 1,
    wherein the at least one number comprises a digital time display including an hour number and a minute number,
    wherein the first user gesture is an input for selecting the minute number, and
    wherein the first arrangement of additional numbers comprises numbers associated with units of minutes corresponding to an attribute of the minute number.

10. An apparatus for providing a user interface screen, the apparatus comprising:
    a display;
    a touch panel that detects a touch input from a user; and
    a controller configured to:
        display a user interface screen including a first number of at least one number on the display,
        in response to detecting a first user gesture on the user interface screen, determine a unit of measurement of the first number and change the user interface screen to display a first arrangement of additional numbers included in a first number range; and
        control the display to display, in response to detecting a second user gesture on the user interface screen including the first arrangement, a second arrangement of additional numbers included in a second number range and a third arrangement of additional numbers included in a third number range,
    wherein the first user gesture is a long touch and the second user gesture is a drag input, and the first user gesture and the second user gesture are continuously inputted on the user interface screen,
    wherein the second number range and the third number range are changed depending on a dragged length of the drag input of the second user gesture, and wherein the first number range, the second number range, and the third number range do not overlap each other, and the second number range and the third number range are each scaled in the determined unit of measurement of the first number.

11. The apparatus of claim 10, wherein the first user gesture is an input for selecting one of the at least one number,
- wherein the controller is further configured to control the display to display the first arrangement and the selected number in a foreground layer of the user interface screen,
- wherein the foreground layer covers the displayed at least one number in a background layer of the user interface screen.

12. The apparatus of claim 10, wherein the first user gesture is an input for selecting one of the at least one number, and
- wherein the controller is further configured to control the display to display the first arrangement of additional numbers in a form surrounding the selected number.

13. The apparatus of claim 10, wherein the first user gesture is a long press input for selecting one of the at least one number, and
- wherein the second user gesture is a tap input for selecting one of the numbers included in the first arrangement or the second arrangement.

14. The apparatus of claim 10, wherein the second user gesture is a touch input dragging the first arrangement outwards.

15. The apparatus of claim 10, wherein the controller is further configured to display the user interface screen through multiple layers, when the second user gesture is detected.

16. The apparatus of claim 10, wherein the at least one number comprises a digital time display including an hour number and a minute number,
- wherein the first user gesture is an input for selecting the hour number, and
- wherein the first arrangement of additional numbers comprises numbers associated with units of 12 hours or 24 hours corresponding to an attribute of the hour number.

17. The apparatus of claim 10, wherein the at least one number comprises a digital time display including an hour number and a minute number,
- wherein the first user gesture is an input for selecting the minute number, and
- wherein the first arrangement of additional numbers comprises numbers associated with units of minutes corresponding to an attribute of the minute number.

* * * * *